(12) United States Patent
Metsker (10) Patent No.: US 7,643,495 B2
(45) Date of Patent: Jan. 5, 2010

(54) PCI EXPRESS SWITCH WITH ENCRYPTION AND QUEUES FOR PERFORMANCE ENHANCEMENT

(75) Inventor: Corey Metsker, Clinton, OH (US)

(73) Assignee: Cisco Technology, Inc., San Jose, CA (US)

( * ) Notice: Subject to any disclaimer, the term of this patent is extended or adjusted under 35 U.S.C. 154(b) by 669 days.

(21) Appl. No.: 11/108,571

(22) Filed: Apr. 18, 2005

(65) Prior Publication Data

US 2006/0251096 A1    Nov. 9, 2006

(51) Int. Cl.
H04L 12/28 (2006.01)
H04L 12/56 (2006.01)
H04L 9/00 (2006.01)
H04K 1/00 (2006.01)

(52) U.S. Cl. ............... 370/398; 370/401; 370/422; 380/255; 380/277

(58) Field of Classification Search ......... 370/351, 370/353, 354, 355, 356, 357, 359, 360, 362, 370/367, 369, 370, 372, 375, 380, 386, 387, 370/388, 389, 391, 396, 398, 395.7, 400, 370/419, 422, 427, 430, 338, 401; 710/22
See application file for complete search history.

(56) References Cited

U.S. PATENT DOCUMENTS 5,222,136 A * 6/1993 Rasmussen et al. ......... 380/266
5,406,322 A * 4/1995 Port et al. ................ 348/14.07
5,640,456 A * 6/1997 Adams et al. ............... 713/153
6,539,031 B1 * 3/2003 Ngoc et al. ................ 370/470
7,058,738 B2 * 6/2006 Stufflebeam, Jr. .......... 710/104
7,151,774 B1 * 12/2006 Williams et al. ........... 370/392

(Continued)

FOREIGN PATENT DOCUMENTS

EP    1 096 736 A2    2/2001

OTHER PUBLICATIONS

PCT International Search Report, International Application No. PCT/US06/12732, Oct. 17, 2007.
European Search Report; EP 06740581; Oct. 22, 2009; Cisco Technology, Inc.; 5 pgs.

*Primary Examiner*—Chirag G Shah
*Assistant Examiner*—Ashley L Shivers
(74) *Attorney, Agent, or Firm*—Tucker Ellis & West LLP (57) ABSTRACT

A switching interface comprising a switch having an input and a plurality of outputs, and a memory associated with the switch. The switch is adapted to receive a packet from the input, the packet to be forwarded to a destination device coupled to a one of the plurality of outputs. The switch is responsive to store the packet in the associated memory. The switch is further responsive to a signal from the destination device to forward the packet from the associated memory to the destination device through the one of the plurality of outputs. Optionally, the switching interface may further comprise a packet encryption engine coupled between the input and the associated memory. Typically, the output devices coupled to the plurality of outputs will each have its own separate encryption process; in these scenarios the encryption engine will have logic for determining the appropriate encryption for the output device.

10 Claims, 3 Drawing Sheets

U.S. PATENT DOCUMENTS

| | | |
|---|---|---|
| 7,423,637 B2 * | 9/2008 | Boals et al. .................. 345/179 |
| 2002/0093973 A1 * | 7/2002 | Tzeng ........................ 370/419 |
| 2003/0095559 A1 | 5/2003 | Sano et al. |
| 2005/0005093 A1 * | 1/2005 | Bartels et al. ................ 713/150 |
| 2005/0243773 A1 * | 11/2005 | Lin et al. .................... 370/334 |
| 2006/0075470 A1 * | 4/2006 | Tanaka et al. ................... 726/2 |

* cited by examiner

PCI EXPRESS SWITCH WITH ENCRYPTION AND QUEUES FOR PERFORMANCE ENHANCEMENT

BACKGROUND OF THE INVENTION

The present invention relates generally to a method and system to connect multiple radio devices to a host with low enough latencies to meet critical timing requirements.

The current industry standard interface for connecting to lower rate radio chipsets (e.g., 802.11a, 802.11b/g, or pre-802.11n) is a PCI (Personal Computer Interface) connection to a MAC (Media Access Control) device. A single 32-bit, 33 MHZ PCI bus, typically used in current systems, cannot sustain sufficient throughput for multiple high data rate radios. In order to use a PCI interface in a multi-radio high performance system, options include multiple parallel PCI busses and/or a wider/faster PCI bus connection, both of which are not desirable in low-power, low-cost, small form factor systems.

Because of PCI bus interface throughput limitations, and a desire for an interconnect requiring less-power and space (e.g., for laptops and mobile applications), the industry standard interface for high-rate radios is evolving towards the PCI Express (PCIe) standard. Unlike PCI, PCI Express is not a multi-drop bus architecture and thus has an independent PCI Express connection for each device. Standard MPU (Micro-Processor Unit) processors with a PCI Express interface provide a limited number of PCI Express connections (typically 1). Thus, in order to interface multiple radios, a PCI Express switch device is used. However, the standard PCI Express switch device is costly, and does not provide for any performance enhancements other than a basic bus multiplexing function.

In order to provide a very high-end feature and performance set, a radio MAC processor would have to access a number of parallel transmit queues with a fast fetch latency. This would enable such features as: a piggyback ACK (acknowledgement) response to a U-ASPD trigger packet; multiple BSSID support including independent QOS (quality of service) queues; enhanced roaming support; and other performance enhancements. Two options to provide the ability to fetch one of many packets with a low latency are, (1) hold packets local at the radio MAC device in internal or external memory, or (2) hold packets in host memory space.

The first option, storing all packets in local MAC memory, requires a very large memory on each radio MAC device. This can be cost prohibitive, particularly with larger packet sizes, such as is supported by the 802.11n protocol.

The second option, storing all packets in host processor memory, is problematic because of contention issues for the host memory, as well as contention for the PCI Express interface to the host processor. Host memory accesses are shared by host CPU code and data fetches for program execution, CPU processing of packet data, wired side Ethernet data flow, data flow to and from other radio devices, as well as any co-processor functions within the host MPU which access packet data via DMA (direct memory access) transfers. In order to support a guaranteed low latency fetch of a packet within host memory (e.g., DRAM), system design parameters would have to be highly optimized. These optimizations include excessively fast/wide memory devices (which are costly and power hungry) not otherwise required, and highly optimized data flow and bus arbitration options which are generally not feasible in standard MPU devices. Although the PCI Express interface supports a high bandwidth, the single PCI Express connection between a PCI switch and a host MPU provides additional latencies due to the need to arbitrate with other radio devices for the single PCI Express port of the MPU.

The difficulty in meeting critical timing requirements of a high-performance system is further compounded by packet encryption, which is typically performed "offline" in the MAC on a per packet basis. Thus, the entire unencrypted packet is first fetched from the host memory (e.g., DRAM) to MAC local memory (e.g., RAM), then transferred via DMA through an encryption engine, preferably a hardware assisted encryption engine. Because the encryption process can't begin until the packet has been fully uploaded from host memory, the encryption process adds linearly to the time required to transmit a given packet. A further limitation of the current, standard radio MAC encryption process is that while basic encryption engine functions are often hardware assisted, mode specific operations involve MAC CPU processing, which further increases the time required to execute the encryption process.

These and other problems of prior art systems are addressed by the present invention as will be described herein.

BRIEF SUMMARY OF THE INVENTION

In accordance with an aspect of the present invention, the present invention contemplates in one embodiment a switching interface comprising a switch having an input and a plurality of outputs, and a memory associated with the switch. The switch is adapted to receive a packet from the input, the packet to be forwarded to a destination device coupled to a one of the plurality of outputs and the switch is responsive to store the packet in the associated memory. The switch is responsive to a signal from the destination device to forward the packet from the associated memory to the destination device through the one of the plurality of outputs. In a preferred embodiment, the switch is a personal computer interface express (PCIe) switch.

Optionally, the switching interface may further comprise a packet encryption engine coupled between the input and the associated memory. Typically, the output devices coupled to the plurality of outputs will each have its own separate encryption, in these scenarios the encryption engine will have logic for determining the appropriate encryption for the output device. The packet encryption engine may employ a hardware assist for performance enhancement.

In accordance with an aspect of the present invention, there is described herein a switching interface comprising a switch means having an input and a plurality of outputs, and a memory means associated with the switch means. The switch means is adapted to receive a packet from the input, where the packet is to be forwarded to a destination device coupled to a one of the plurality of outputs. The switch means is responsive to store the packet in the associated memory means. The switch means is responsive to a signal from the destination device to forward the packet from the associated memory means to the destination device through the one of the plurality of outputs. The switch means may optionally include encryption means.

In accordance with an aspect of the present invention, there is described herein a method for routing a packet through a switching interface with an input and a plurality of outputs. The method comprising receiving the packet, storing the packet in a memory associated with the switching interface, and sending the packet to an output device associated with a one of the plurality of outputs responsive to a signal from the output device. The method may also include encrypting the packet before it is stored in the memory associated with the switching device.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Throughout this description, the preferred embodiment and examples shown should be considered as exemplars, rather than limitations, of the present invention. The present invention contemplates a system and method for implementing a high-performance cost sensitive, power-sensitive and size sensitive solution that is adaptable for use with systems having multiple wireless transceivers coupled to a host. The functionality can be implemented as a stand-alone silicon device, such as an application specific integrated circuit (ASIC) or embedded into a larger system on chip (SoC) device. An aspect of the present invention is that it allows large number of transmit buffer queues to be available for transmission for an 802.11 MAC, enabling it to meet latency requirements. A scalable PCI Express switch function as described herein allows standard 802.11 MAC devices to be interconnected to standard access point host processor in such a manner to implement multiple high-performance 802.11 radios in a single access point.

A single ASIC device can serve as a PCI Express Switch while also providing a means of storing a large number of 802.11 transmit queues with low enough latencies to meet critical 802.11 timing requirements. This single ASIC allows multiple 802.11 MAC devices to be connected to an Access point host processor through a PCI Express Switch function which is scalable in nature and can support 1 to N 802.11 MAC devices. In addition to the PCI Express Features, the custom ASIC device also provides some key functions critical to implementing a high-performance access point with multiple 802.11 radios: an interface to standard high-speed SRAM device, a hardware based in-line encryption engine, and custom arbitration functions which reduce latencies of critical data flow of transmit packet from high-speed SRAM to 802.11 MAC local buffer.

802.11 receive packet data flow is unaffected by 802.11 enhancements of the custom ASIC. Receive queues are located within the 802.11 MAC device's local memory buffer, decryption is performed within the 802.11 MAC device, and receive packets are transferred through the PCI Express Switch to the host processor DRAM through standard PCI Express memory write operation.

An accord with an aspect of the present invention, 802.11 transmit packet data flow is enhanced by the custom ASIC. The Access Point (AP) host processor fills transmit queues within the high-speed SRAM (instead of in standard DRAM). The host processor writes transmit packets to external SRAM through a PCI Express memory write operation. Custom ASIC routes these PCI Express memory writes from host processor to high-speed SRAM. Additionally, as needed, custom ASIC routes transmit data through in-line hardware encryption engines such that encrypted data is stored in transmit queues within high-speed SRAM. In order to transmit a packet, 802.11 MAC transfers encrypted data packet from high-speed SRAM to internal local transmit buffer memory space—this transfer is through DMA function which executes memory read accesses on PCI Express interface. Once encrypted data is in the local 802.11 MAC buffer, then the data is transmitted to 802.11 PHY through standard 802.11 MAC operation.

The transfer from high-speed SRAM to local 802.11 MAC buffer space is usually time critical. High speed transfer is enabled by: the parallel nature of individual PCI Express connections to multiple 802.11 MAC devices, high burst data rates and low overhead associated with PCI Express interface, and high-speed parallel interface to SRAM device, and custom arbitration within ASIC which prioritizes transmit data flowing from SRAM to 802.11 MACS.

Beyond allowing increase in transmit buffer queue space, other advantages to this architecture are virtually any host CPU/OS and any 802.11 MAC can be interconnected by eliminating the critical transmit data flow latency issue with very little effect on existing host software architecture. The switch uses standard ASIC modules, which are scalable and enables an adjustable number of radios and an adjustable buffer size for each radio. A custom transmit buffer can be disabled for some downstream PCI express ports to allow for any device with PCI Express to be connected directly through PCI Express switch. Storing TX (transmit) packets in high-speed SRAM frees up space in both local 802.11 MAC buffer and host DRAM for receive buffers or other memory requirements.

An advantage of the present invention is that it allows standard 802.11 MAC devices to have larger usable transmit buffer queue space than is provided within the internal memory buffer of the 802.11 MAC device, which is an inherent advantage over standard 802.11 MAC device alone. Another advantage is that bottlenecking problems at the host caused by multiple devices contending for the shared host DRAM (e.g., the host CPU, PCIe interface and/or 802.3 interface) for time critical transfers is reduced because the packets are stored in memory at the switch, upstream from the host.

Figure 1:
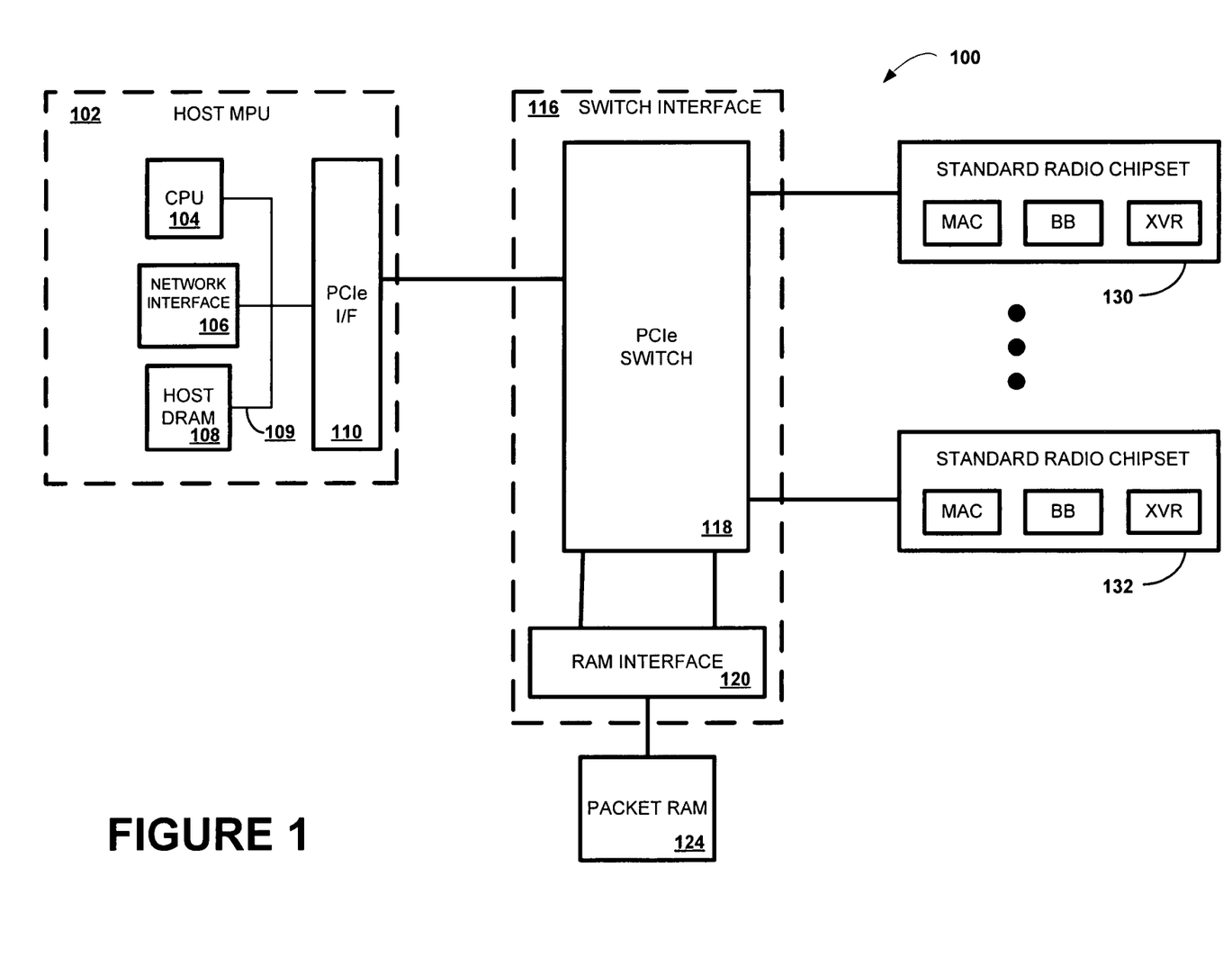
FIG. 1 is a block diagram of a system in accordance with an aspect of the present invention.

FIG. 1 is a block diagram of a system 100 in accordance with an aspect of the present invention. Switch interface 116 is coupled to a host MPU 102 and a plurality of standard radio chipsets 130 . . . 132 (130, 132). Switch interface 116 comprises a personal computer interface express (PCIe) switch and a memory (RAM) interface 120 for storing and retrieving packets from an associated memory (packet RAM) 124. Although as illustrated packet RAM 124 is external to switch 124, it is also contemplated that switch interface 116 can have internal memory in addition to, or alternative, to packet RAM 124.

Host MPU 102 receives packets for transmission from network interface 106. If necessary, CPU 104 processes the packets. Eventually the packets are stored in host DRAM 108. It should be noted that the transfer occurs over connection 109, which is shared by CPU 104, Network Interface 106, PCIe Interface 110 and Host DRAM 108. Packets are subsequently sent via PCIe Interface (I/F) 110 to switch interface 116. As can be observed in FIG. 1, CPU 104, Network Interface 106 and Host DRAM 108 share a connection 109 to PCIe Interface 110. The shared connection may further comprise a suitable switching system (not shown), such as a switch fabric, a multiplexer, or a bus sharing system.

When the packet arrives at switch interface 116, it is routed by PCIe switch 118 via RAM interface 120 to packet RAM 124. In a preferred embodiment, packet RAM 124 comprises a pool of memory configured for servicing a plurality of variable length queues (not shown). These queues store packets for radio devices 130, 132, etc. The queues are variable length so that they can be adjusted to provide additional queue space as needed by one of radio devices 130, 132. When the radio device 130,132 no longer needs the additional queue space, the memory is returned to the pool. The radio device, e.g., radio device 130 or 132, retrieves the packet from packet RAM 124 on an as-needed basis. In a preferred embodiment, a DMA (direct memory access) transfer is used to transfer the packet from packet RAM 124 to radio devices 130, 132; however, any suitable data transfer technique is acceptable.

A feature of system 100 illustrated in FIG. 1 is that it eliminates contention for shared connection 109 between CPU 104, network interface 106 and host DRAM 108 and PCIe Interface 110. This is because packets destined for radio devices 130, 132 are stored upstream in packet RAM 124. Connection 109 can cause problems with time critical applications. For example if a radio device 130, 132 needs a packet in host DRAM 108, it may not be able to retrieve the packet in time if another device, e.g., one or both of CPU 104 or network interface 106 are using connection 109.

Figure 2:
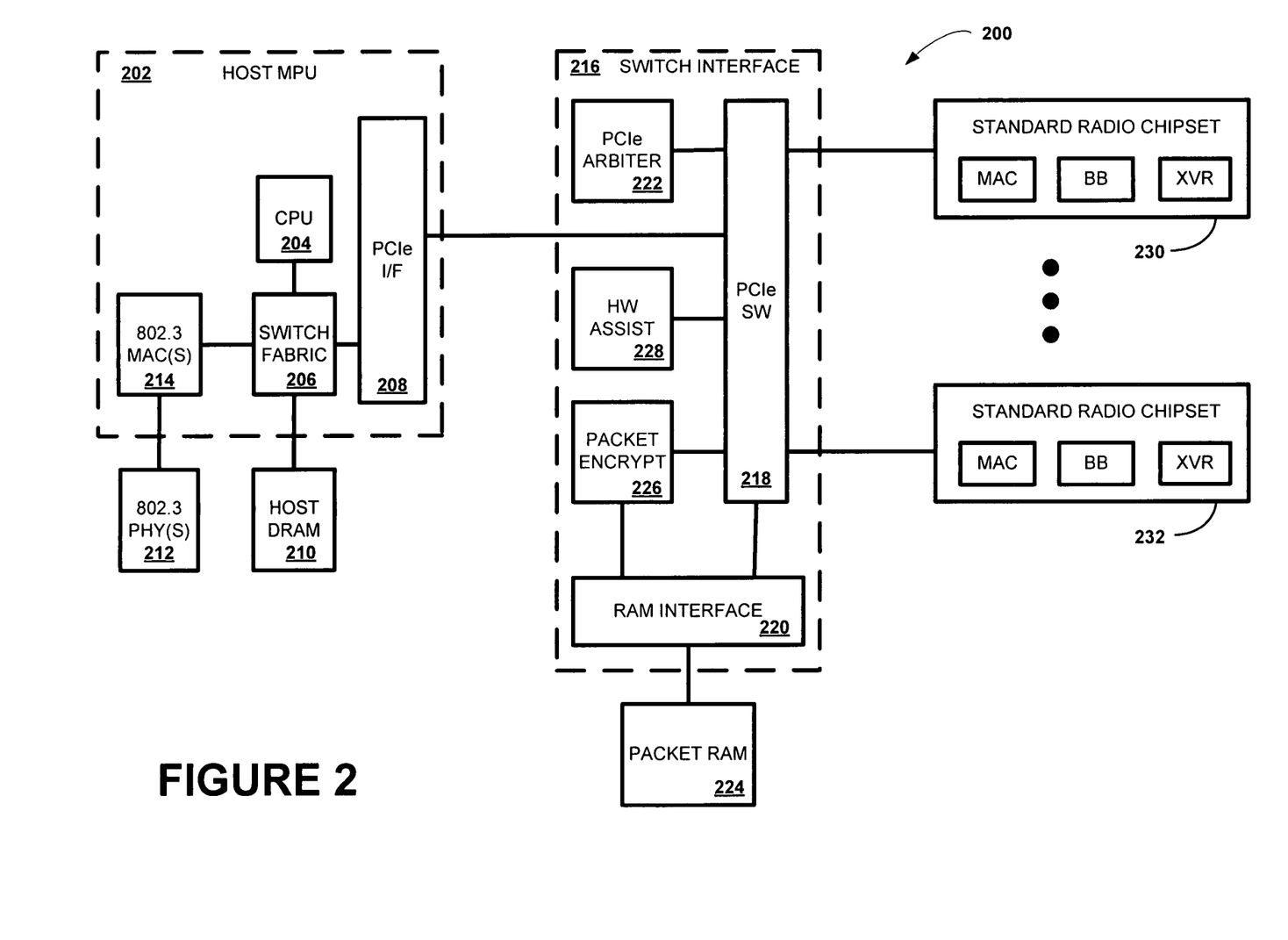
FIG. 2 is a block diagram of a switching interface that includes encryption capabilities in accordance with an aspect of the present invention.

FIG. 2 is a block diagram of a system 200 with a switching interface 216 that includes encryption capabilities in accordance with an aspect of the present invention. Switch interface 216 provides a method for transferring packets from host MPU 202 to one of a plurality of wireless transceivers 230 . . . 232 (230, 232).

PCIe switch 218 provides mechanisms to interconnect multiple wireless transceivers 230,232 to host MPU 202 with a PCIe interface. The PCIe switch should be highly configurable with regard to data packet size bursts, allowing for system optimization. FIFOS are implemented to allow for worst-cast latencies on all interconnect paths.

Packet encryption engine (Packet Encrypt) 226 is coupled to PCIe switch 218 and provides a mechanism for packets to be encrypted prior to being stored in packet RAM 224. Packet encryption engine 226 is adapted to support industry standard encryption schemes as well as pre-standard and custom encryption methods.

RAM interface 220 coupled to packet encryption engine 226 and PCIe switch 218 and provides an interface to packet RAM 224, which can be any type of memory device. RAM interface 220 also provides for arbitration between packets flowing through the TX engine into packet RAM 224, such as through packet encryption engine 226, and packets flowing from packet RAM 224 to wireless transceivers 230, 232. Although packet RAM 224 is illustrated as being external to switch interfaced 216, it is also contemplated that packet RAM 224 can be embedded with switch interface 216 as well.

PCIe Arbiter 222 provides for management of the various resources which are contending for the single PCIe interconnect from host MPU 202 to PCIe Switch 218. These include transfers (such as DMA) initiated by wireless transceivers 230, 232, CPU 204 accesses to wireless transceivers 230, 232, and traffic (I/O and DMA) between CPU 204/MPU 202 and hardware assist (HW assist) engine 228. Preferably, PCIe arbiter 222 is highly configurable to ensure that required latencies can be realized utilizing various system configurations.

HW assist engine 228 provides hardware, such as combinational logic or other means for accelerating computational functions otherwise performed by host CPU 204 or a MAC processor of wireless transceivers 230,232. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. Either CPU 204 or a MAC processor on wireless transceiver 230, 232 can access HW assist engine 228 either through direct access or DMA based data transfers. For example, HW assist engine 228 can perform hardware acceleration functions such as CAM (content addressable memory) lookup, encryption assist, memory management, or custom application specific functions.

In operation, a typical packet to be transmitted by one of wireless transceivers 230, 232 is received through the 802.3 PHY and 802.3 MAC 214 and forwarded through switch fabric 206 and stored in host DRAM 210. The packet is then processed accordingly (e.g., packet concatenation) by CPU 204. The packet is typically transferred via DMA from 803.3 MAC 214 to host DRAM 210. CPU 204 processes the packet in host DRAM 210 to prepare it for transmission by one of wireless transceivers 230, 232.

CPU 204 then manages transferring the packet from host DRAM 210 to packet RAM 224 using a DMA transfer(s). The packet is retrieved from host DRAM 210 and routed through switch fabric 206 and PCIe interface (PCIe I/F) 208 to switch interface 216. The transfer further includes encrypting the packet in-line through packet encryption engine 226, which may accelerate the encryption process by utilizing logic from HW assist 228. After being encrypted by packet encryption engine 226, the packet is forwarded to packet RAM 224 via RAM interface 220. Thus, in accordance with an aspect of the present invention, the packets are stored encrypted in packet RAM 224. Then, when the wireless transceiver (e.g., one of 230, 232) that is to transmit the packet needs the packet, the packet can be merely sent to the wireless transceiver and transmitted, and does not need any further processing. In a preferred embodiment CPU 204 alerts the appropriate wireless transceiver (one of 230, 232) through I/O access that an encrypted transmit (TX) packet is available in packet RAM 224.

When the wireless transceiver (e.g., one of wireless transceivers 230, 232) is ready to transmit the packet, it retrieves the packet via a transfer (e.g., DMA or burst) from packet RAM 224. The packet is sent across PCIe switch 218 via RAM interface 220 to the appropriate wireless transceiver 230, 232. This feature enables smaller memories to be employed by the wireless transceiver as packets are queued, already encrypted, in packet RAM 224 and do not need to be stored at the wireless transceiver 230, 232 until the appropriate wireless transceiver, one of 230, 232, is ready to send the packet.

It should be noted that processing packets received by wireless transceivers 230, 232 is typically not time critical. Packets received by wireless transceivers 230, 232 can be decrypted by the wireless transceiver 230, 232 and sent to host MPU 202 as they are received. QOS optimizations may allow received (RX) packets to be sent to host MPU 202 in an order other than "first-received." In any scenario, a minimal amount of RX buffer space local to the wireless transceiver's 230,232 MAC is adequate to prevent buffer over-run. It is possible to decrypt in-line using packet encryption engine 226 in switch interface 216, however it is often necessary for the wireless MAC to make decisions based on the contents of RX packets, thus decryption is preferably executed locally to the wireless transceiver's MAC.

Figure 3:
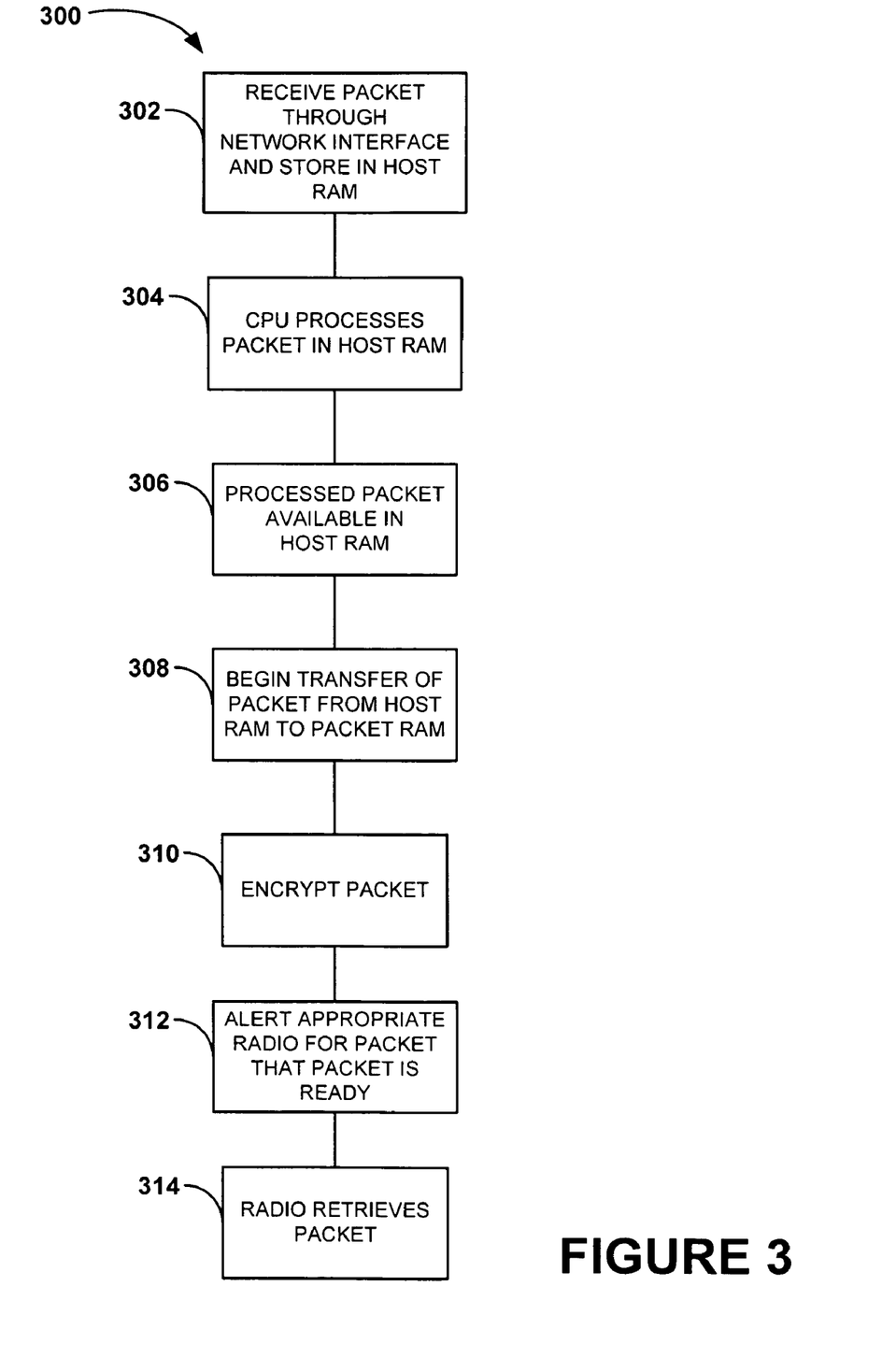
FIG. 3 is a flow diagram of a method in accordance with an aspect of the present invention.

In view of the foregoing structural and functional features described above, a methodology in accordance with various aspects of the present invention will be better appreciated with reference to FIG. 3. While, for purposes of simplicity of explanation, the methodology of FIG. 3 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

FIG. 3 is a flow diagram of a method 300 in accordance with an aspect of the present invention. The method 300 is suitably adaptable for receiving a packet to be transmitted via a host coupled to a network and forwarding the packet to the appropriate wireless transceiver for transmission.

At 302, the packet is received through the network interface and stored in host RAM. The network is suitably any wired or wireless network. Typically, the network is an Ethernet (802.3) backbone.

At 304 the packet is processed by a CPU. The CPU processing can include, but is not limited to, packet concatenation, and determining the appropriate wireless transceiver for transmitting the host. After the packet is processed by the CPU at 304, the processed packet is available in host RAM at 306.

The CPU then manages transferring the packet from the host RAM to a packet RAM that is upstream from the host. The process begins at 308. The transfer is suitably one of a burst transfer, DMA transfer, or any suitable packet transferring process. The packet is encrypted at 310. The encryption preferably occurs while the packet is being transferred from the host RAM to the packet RAM. After the packet has been transferred to the packet RAM and encrypted, at 312 the appropriate wireless transceiver that will be transmitting the packet is alerted that the packet is ready. The alert is suitably sent by the host, or sent by any other device that can detect when the transfer of the packet from the host RAM to the packet RAM has been completed.

The wireless transceiver sending the packet then retrieves the encrypted packet from the packet RAM at 314. Because the packet is already encrypted when stored in the packet RAM, the speed of packet transfer to the wireless transceiver is improved. Furthermore, because the packet is being transferred from a memory coupled to the PCIe switch upstream from the host, it is easier to meet the latency requirements for time critical applications because the packet transfer does not have to contend with other processes at the host.

To summarize, an aspect of the present invention is a PCI Express switch function which allows PCI Express interconnects as necessary to provide sufficient system bandwidth while minimizing cost, size and power. Mechanisms are provided allowing the wireless transceiver MAC to retrieve encrypted packets for immediate transmission and to meeting critical system requirements. The packet encryption engine eliminates the requirement that the wireless transceiver's MAC encrypt the packet during a time critical process. The dedicated packet RAM minimizes the time to fetch a packet by eliminating bottlenecks at the host DRAM and host PCI Express interconnect. The PCI Express Arbitrator provides sufficient bus bandwidth for multiple radio devices, and prioritizes time critical data transfers.

Embodiments of the present invention facilitate CPU efficiency. For example a hardware assist engine provides hardware for accelerating critical operations and software algorithms. Because of aspects of the present invention, TX packet transfers from host DRAM are not time critical, this allows host MPU design to be optimized for CPU performance. A flexible encryption engine is provided which allows advanced and custom encryption features to be implemented without CPU overhead.

An additional benefit of the present invention is cost reduction. A low pin-count PCI Express interconnect provides for decreased system thermal dissipation. Standard host MPU and wireless transceiver chipsets are suitably adaptable for use with the present invention. By using a memory pool coupled to the PCI express switch, the present invention obviates the need for large RAM memories local to each wireless transceiver's MAC and relaxes the requirements of host DRAM such that narrower and slower devices can be used.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A system comprising:
   a switch having an input, a plurality of outputs, and an encryption engine;
   a first wireless transceiver comprising a first media access control device coupled to a first of the plurality of outputs;
   a second wireless transceiver comprising a second media access control device coupled to a second of the plurality of outputs;
   a host processor unit comprising a central processing unit, a network interface, a host memory, and a host interface coupled by a bus to the input of the switch; and
   a memory coupled with the switch, upstream from the host;
   wherein data is received via the network interface and stored in the host memory;
   wherein the data is subsequently forwarded via the host interface to the input of the switch for transmission by a one of a group consisting of the first wireless transceiver and the second wireless transceiver;
   wherein the switch is configured to receive the data from the host interface at the input;

wherein the encryption engine is configured to encrypt the data as encrypted data, and the switch is responsive to store the encrypted data in the memory coupled with the switch;

wherein a signal is sent to the one of the group consisting of the first wireless transceiver and the second wireless transceiver responsive to the data being transferred to the memory coupled with the switch; and wherein the one of the group consisting of the first wireless transceiver and the second wireless transceiver is configured to retrieve the data from the memory coupled with the switch responsive to the signal.

2. A system according to claim 1, further comprising a hardware assist engine coupled to the switch.

3. A system according to claim 2, wherein the hardware assist engine is configured to perform at least one of content addressable memory lookup, encryption assistance, memory management and custom application specific functions.

4. A system according to claim 1, the encryption engine further comprises logic for determining an appropriate encryption algorithm including a first encryption algorithm for use with the first wireless transceiver and a second encryption algorithm for use with the second wireless transceiver.

5. A system according to claim 1, wherein the switch is a personal computer interface express switch configured to receive a personal computer interface express signal on the input and to provide a personal computer interface express signal to the plurality of outputs.

6. A system according to claim 1, wherein the apparatus is embodied in one of a system on chip and an application specific integrated circuit.

7. A system, comprising:
a switch means having an input, a plurality of outputs and encryption means;
first means for wireless transmission comprising a first media access control means coupled to a first of the plurality of outputs;
second means for wireless transmission comprising a second media access control means coupled to a second of the plurality of outputs; and,
host processing means comprising processing means, means for interfacing with a network, host means for storage, means for interfacing with the switch and means for communication coupling the processing means, means for interfacing with a network, means for storage and means interfacing with the switch, wherein the means for interfacing with the switch couples the means for communication to the switch means;
a memory means coupled with the switch means, upstream from the host processing means;
wherein a packet is received via the means for interfacing with a network and transferred via the means for communication to the means for storage;
wherein the encryption means is configured to encrypt the packet as encrypted data;
wherein the encrypted data is subsequently forwarded from the means for storage via the means for interfacing and the means for interfacing with the network to the memory means coupled with the switch;
wherein the switch means is configured to receive the packet from the input, the packet to be forwarded to a one of a group consisting of the first means for wireless transmission and the second means for wireless transmission to store the packet in the coupled memory means;
wherein the one of the group consisting of the first means for wireless transmission and the second means for wireless transmission is signaled responsive to the data being transferred to the memory means coupled with the switch means; and
wherein the one of the group consisting of the first means for wireless transmission and the second means for wireless transmission is configured to retrieve the data from the memory means coupled with the switch means.

8. A system according to claim 7, wherein the packet encryption means is responsive to the packet being received from the input to encrypt the packet before storing the packet in the coupled memory.

9. A system according to claim 7, wherein the plurality of outputs have an associated output device, wherein the encryption algorithm for each of the plurality of associated output devices is different, and the encryption means further comprising means for determining the appropriate encryption algorithm for the associated output device for the packet.

10. A system according to claim 7, wherein the switch means comprises means configured for receiving a personal computer interface express signal and means to send a provided personal computer interface express signal to the plurality of outputs.

* * * * *

UNITED STATES PATENT AND TRADEMARK OFFICE
CERTIFICATE OF CORRECTION

| | | |
|---|---|---|
| PATENT NO. | : 7,643,495 B2 | Page 1 of 1 |
| APPLICATION NO. | : 11/108571 | |
| DATED | : January 5, 2010 | |
| INVENTOR(S) | : Corey Metsker | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 969 days.

Signed and Sealed this

Twenty-first Day of December, 2010

David J. Kappos
*Director of the United States Patent and Trademark Office*